United States Patent
Yu (10) Patent No.: US 12,511,007 B2
(45) Date of Patent: Dec. 30, 2025

(54) METHOD, APPARATUS, DEVICE, READABLE STORAGE MEDIUM AND PRODUCT FOR DISPLAYING TARGET CONTENT

(71) Applicant: Beijing Zitiao Network Technology Co., Ltd., Beijing (CN)

(72) Inventor: Qin Yu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 90 days.

(21) Appl. No.: 18/567,267

(22) PCT Filed: May 30, 2022

(86) PCT No.: PCT/CN2022/095882
§ 371 (c)(1),
(2) Date: Dec. 5, 2023

(87) PCT Pub. No.: WO2022/257797
PCT Pub. Date: Dec. 15, 2022

(65) Prior Publication Data
US 2024/0272760 A1  Aug. 15, 2024

(30) Foreign Application Priority Data
Jun. 9, 2021 (CN) .......................... 202110644490.9

(51) Int. Cl.
*G06F 3/0481* (2022.01)
(52) U.S. Cl.
CPC ................................ *G06F 3/0481* (2013.01)

(58) Field of Classification Search
CPC ..... G06F 3/0481; G06F 3/0484; G06F 3/0482
See application file for complete search history.

(56) References Cited

U.S. PATENT DOCUMENTS

| 2011/0041059 A1 | 2/2011 | Amarasingham et al. |
| 2020/0336805 A1 | 10/2020 | Yoon et al. |

(Continued)

FOREIGN PATENT DOCUMENTS

| CN | 108536344 A | 9/2018 |
| CN | 108933946 A | 12/2018 |

(Continued)

OTHER PUBLICATIONS

Yuhang Zhao et al., Analysis of TikTok's Success Based on Its Algorithm Mechanism, Aug. 1, 2020, International Conference on Big Data and Social Sciences, pp. 19-23 (Year: 2020).*

(Continued)

*Primary Examiner* — Tam T Tran
(74) *Attorney, Agent, or Firm* — Fish & Richardson P.C.

(57) ABSTRACT

Embodiments of the present disclosure provide a method, device, and medium for displaying a target content. The method comprises: in response to an input from a first user for a target content, generating text information corresponding to the target content based on the input; detecting the text information in response to a post request for the target content triggered by the first user; and in response to detecting that the text information contains a preset field, determining a target function associated with the preset field so that after the target content is posted, a function control corresponding to the target function is displayed in a display interface of target content for a second user.

18 Claims, 7 Drawing Sheets

(56) References Cited

U.S. PATENT DOCUMENTS

| | | | |
|---|---|---|---|
| 2020/0410158 A1 | 12/2020 | Waters et al. | |
| 2021/0168473 A1* | 6/2021 | Li | H04N 21/8166 |
| 2022/0068313 A1* | 3/2022 | Shafir Nir | G06V 20/48 |
| 2023/0079509 A1* | 3/2023 | Narita | G06F 13/00 |

FOREIGN PATENT DOCUMENTS

| | | | |
|---|---|---|---|
| CN | 109005352 A | 12/2018 | |
| CN | 109274978 A | 1/2019 | |
| CN | 110012362 A | 7/2019 | |
| CN | 111064987 A | 4/2020 | |
| CN | 111460769 A | 7/2020 | |
| CN | 111596991 A | 8/2020 | |
| CN | 111726536 A | 9/2020 | |
| CN | 111935498 A | 11/2020 | |
| CN | 112040267 A | 12/2020 | |
| CN | 113253885 A | 8/2021 | |

OTHER PUBLICATIONS

Xueli Li et al., Research on an Empirical Analysis of Short Video Transmission in Kindergartens Based on SPSS, Apr. 1, 2021, International Conference on Big Data and Information Education, pp. 106-109 (Year: 2021).*

Notification of Intention to Grant Chinese Appln. No. 202110644490.9, dated May 22, 2023, 6 pages (with English translation).

International Search Report (with English translation) and Written Opinion issued in PCT/CN2022/095882, dated Aug. 9, 2022, 11 pages provided.

Office Action issued in corresponding Chinese Application No. 202110644490.9, dated Oct. 25, 2022, with machine translation.

* cited by examiner

METHOD, APPARATUS, DEVICE, READABLE STORAGE MEDIUM AND PRODUCT FOR DISPLAYING TARGET CONTENT

CROSS REFERENCE

The present disclosure claims priority to Chinese Patent Application No. 202110644490.9 filed on Jun. 9, 2021 and entitled "METHOD, APPARATUS, DEVICE, READABLE STORAGE MEDIUM AND PRODUCT FOR DISPLAYING TARGET CONTENT", which is hereby incorporated by reference in its entirety.

FIELD

Embodiments of the present disclosure generally relate to the field of data processing, and in particular, to a method, apparatus, device, readable storage medium and product for displaying target content.

BACKGROUND

With the development of terminal device and networks, short video applications have gradually entered the lives of users. In order to increase the user's interest in using short video applications, a variety of video games are provided. For example, for some hot or popular short videos, a button for "duet" can be provided so that users can press the duet button to use the background music, action, and other media content of the short video to create a short video of the same style, thereby implementing the effect of co-production.

SUMMARY

Embodiments of the present disclosure provide a method, apparatus, device, readable storage medium, and product for displaying target content to solve the problems related to the small area of the displaying and use of the duet button and low controllability for the author in the conventional solutions.

In a first aspect, embodiments of the present disclosure provide a method of displaying target content, comprising:
in response to an input from a first user for a target content, generating text information corresponding to the target content based on the input;
detecting the text information in response to a post request for the target content triggered by the first user; and
if the text information is detected to contain a preset field, determining a target function associated with the preset field so that after the target content is posted, a function control corresponding to the target function is displayed in a display interface of target content for a second user.

In a second aspect, embodiments of the present disclosure provide an apparatus for a displaying target content, comprising:
a generating module configured to, in response to an input from a first user for a target content, generate text information corresponding to the target content based on the input;
a detecting module configured to detect the text information in response to a post request for the target content triggered by the first user; and
a determining module configured to determine a target function associated with a preset field if the text information is detected to contain the preset field, so that after the target content is posted, a function control corresponding to the target function is displayed in a target content display interface for a second user.

In a third aspect, embodiments of the present disclosure provide an electronic device comprising: at least one processor and memory;
the memory storing computer-executable instructions; and
the computer-executable instructions stored in the memory, when executed by at least one processor, causing the at least one processor to execute the method for displaying target content of any of the first aspect above and in the various possible designs of the first aspect.

In a fourth aspect, embodiments of the present disclosure provide a computer-readable storage medium stores computer-executable instructions, the computer-executable instructions, when executed by a processor, implements the method for displaying target content of the first aspect above and in the various possible designs of the first aspect.

In a fifth aspect, embodiments of the present disclosure provide a computer program product, wherein comprises a computer program, the computer program, when executed by a processor, implements the method for displaying target content of the first aspect above and in the various possible designs of the first aspect.

In a sixth aspect, embodiments of the present disclosure provide computer program, wherein the computer program, when executed by a processor, implements the method for displaying target content of the first aspect above and in the various possible designs of the first aspect.

Embodiments of the present disclosure provide a method, apparatus, device, readable storage medium, and product for displaying a target content. The method, after generating text information corresponding to the target content based on the first user's input for the target content, in response to a post request for the target content triggered by the first user, the displaying apparatus for the target content may detect whether or not the predetermined fields are included in the text message. If the text information is detected to contain a preset field, determining a target function associated with the preset field so that after the target content is posted, a function control corresponding to the target function is displayed in a display interface of target content for a second user.

BRIEF DESCRIPTION OF THE DRAWINGS

In order to make the technical solution of the embodiment of the present disclosure clearer, embodiments of the present disclosure of the present disclosure will be described clearly and completely in the following in conjunction with the accompanying drawings. Obviously, the described embodiments are a part of the embodiments of the present disclosure, not all of the embodiments. Based on the embodiments of the present disclosure, all other embodiments obtained by ordinary skill in the art without creative labor fall within the scope of protection of the present disclosure.

DETAILED DESCRIPTION

In order to make the purpose, technical solution, and advantages of the embodiment of the present disclosure clearer, embodiments of the present disclosure of the present disclosure will be described clearly and completely in the following in conjunction with the accompanying drawings. Obviously, the described embodiments are a part of the embodiments of the present disclosure, not all of the embodiments. Based on the embodiments of the present disclosure, all other embodiments obtained by ordinary skill in the art without creative labor fall within the scope of protection of the present disclosure.

With regard to the above-mentioned technical problem that the small area of the displaying and use of the duet button and low controllability for the author in the conventional solutions, the embodiments of the present disclosure provide a method, apparatus, device, readable storage medium, and product for displaying the target content.

It should be noted that the displaying method, apparatus, device, readable storage medium, and product of the target content provided by the present disclosure can be used in the display scene of various function controls corresponding to the target content.

In existing short video applications, after some short videos are posted, other users can execute a duet operation based on the short video. Specifically, the duet button can be displayed on the display interface, and other users can trigger the duet button to execute the duet operation. However, when creating a duet video in the above way, it is only possible to display the duet button for the short video that has been posted and has a certain volume of views and the duets. For the newly posted short video, the duet button cannot be displayed. Moreover, the author of a short video cannot control the display operation of the duet button if posting a short video.

In order to improve the controllability of the duet button, users can input text information comprising preset fields if posting the target content. If it detects that any text information of the target content to be posted contains a preset field, it can correspond to the target function associated with the preset field according to the preset field. The target content display interface on the side of the second user displays the function control corresponding to the target function so that the second user can use the corresponding target function in the interactive interface of the target content. In this way, the function control can be displayed based on the content input by the first user, and the first user can thus control the display of the function control according to actual requirements. In addition, according to the method, control operations for function controls can be executed according to newly posted target content, and the applicability is high.

Figure 1:
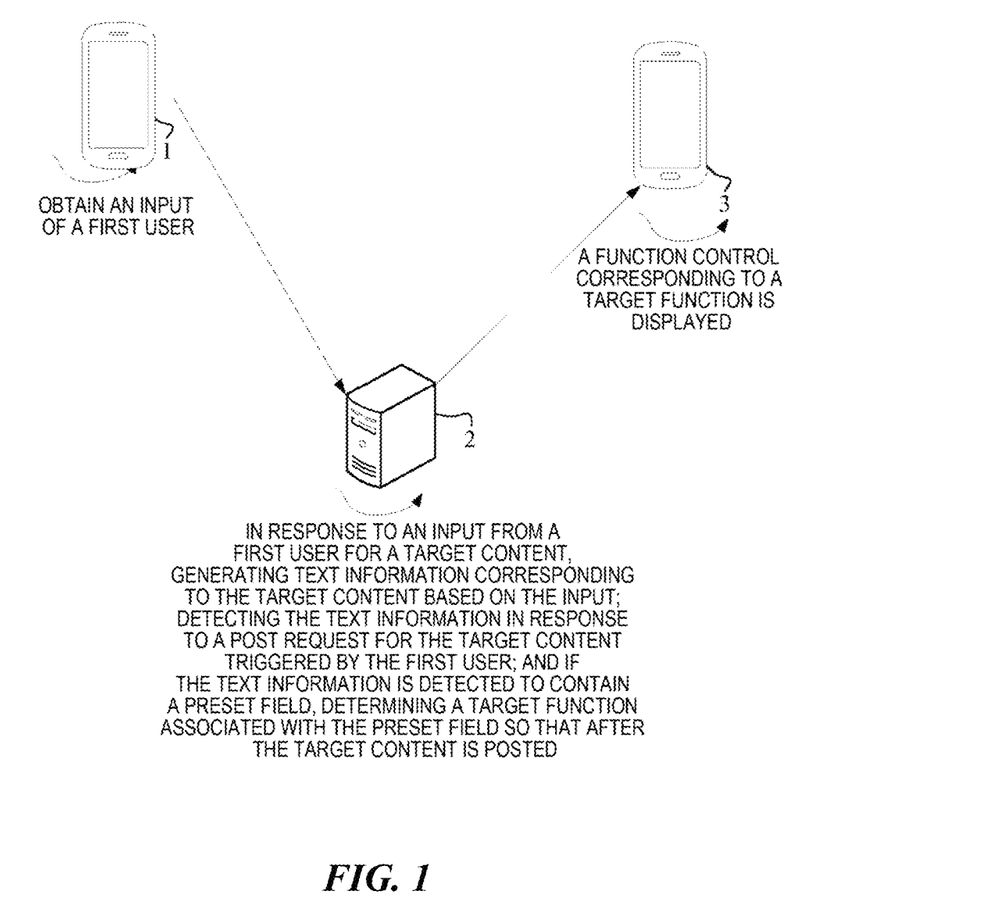
FIG. 1 illustrates a schematic diagram of a network architecture based on the present disclosure.

FIG. 1 illustrates a schematic diagram of a network architecture based on the present disclosure. As illustrated in FIG. 1. The network architecture based on the present disclosure at least comprises: a terminal device 1, a server 2, and a terminal device 3. Herein, a displaying apparatus of the target content is set in the server 2, and the displaying apparatus of the target content is written in C/C++, Java, Shell or Python, and other languages; the terminal device 1 and the terminal device 3 can be, for example, desktop computers, tablet computers, and so on.

Herein, the server 2 communicates with the terminal device 1 and the terminal device 3 respectively, so that it can exchange information with the terminal device 1 and the terminal device 3 respectively.

Figure 2:
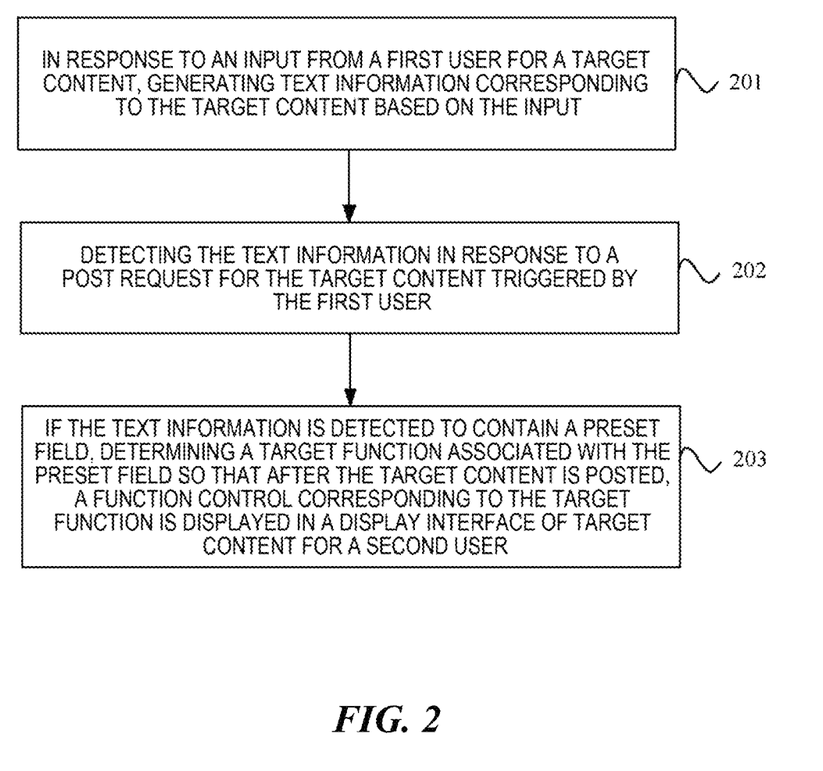
FIG. 2 illustrates a flowchart of a displaying method of target content provided by embodiment 1 of the present disclosure.

FIG. 2 illustrates a flowchart of a displaying method of target content provided by embodiment 1 of the present disclosure. As illustrated in FIG. 2, the method comprises:

Step 201. In response to an input from a first user for a target content, generating text information corresponding to the target content based on the input.

The execution subject of embodiments of the present disclosure is the displaying apparatus of the target content, i.e., a client server displaying the target content on the terminal device can communicate with the client of the first user and the client of the second user respectively.

In embodiments of the present disclosure, the first user may conduct an input of the text information corresponding to the target content on the terminal device before conducting a posting operation of the target content. Specifically, in response to the input of the first user for the target content, the client on the terminal device may generate the text information corresponding to the target content according to the input.

For example, the target content can be a short video to be posted. The first user can first input the text information corresponding to the short video on the terminal device before posting the short video.

Step 202. Detecting the text information in response to a post request for the target content triggered by the first user.

In embodiments of the present disclosure, a posting button can be preset on the display interface, and the first user can implement the posting of the target content by triggering the posting button. Specifically, in response to the post request for the target content triggered by the first user, the client may conduct a detection operation on the text information.

Taking up the above example, in order to implement the controllable display of the function button, during the process of text input, a part of the preset field can be preset, which can be a preset topic information, for example, the preset field can be in the format of #preset field#.

Thus, after obtaining the posting request for the target content, it can be detected whether or not a preset field is comprised in the textual information. Optionally, it may also be detected whether the textual information comprises a preset symbol, etc., and the present disclosure is not limited thereto.

Step 203. If the text information is detected to contain a preset field, determining a target function associated with the preset field so that after the target content is posted, a function control corresponding to the target function is displayed in a display interface of target content for a second user.

In embodiments of the present disclosure, if the text information is detected to contain a preset field, a target function associated with the preset field may be determined, wherein the preset field has an associated relationship with the target function. After the target content is posted, a function control corresponding to the target function is displayed in a display interface of target content for a second user. Thereby, if the second user conducts browsing of the target content on the terminal device, he or she can implement the preset operation of the target content by triggering the function control.

Figure 3:
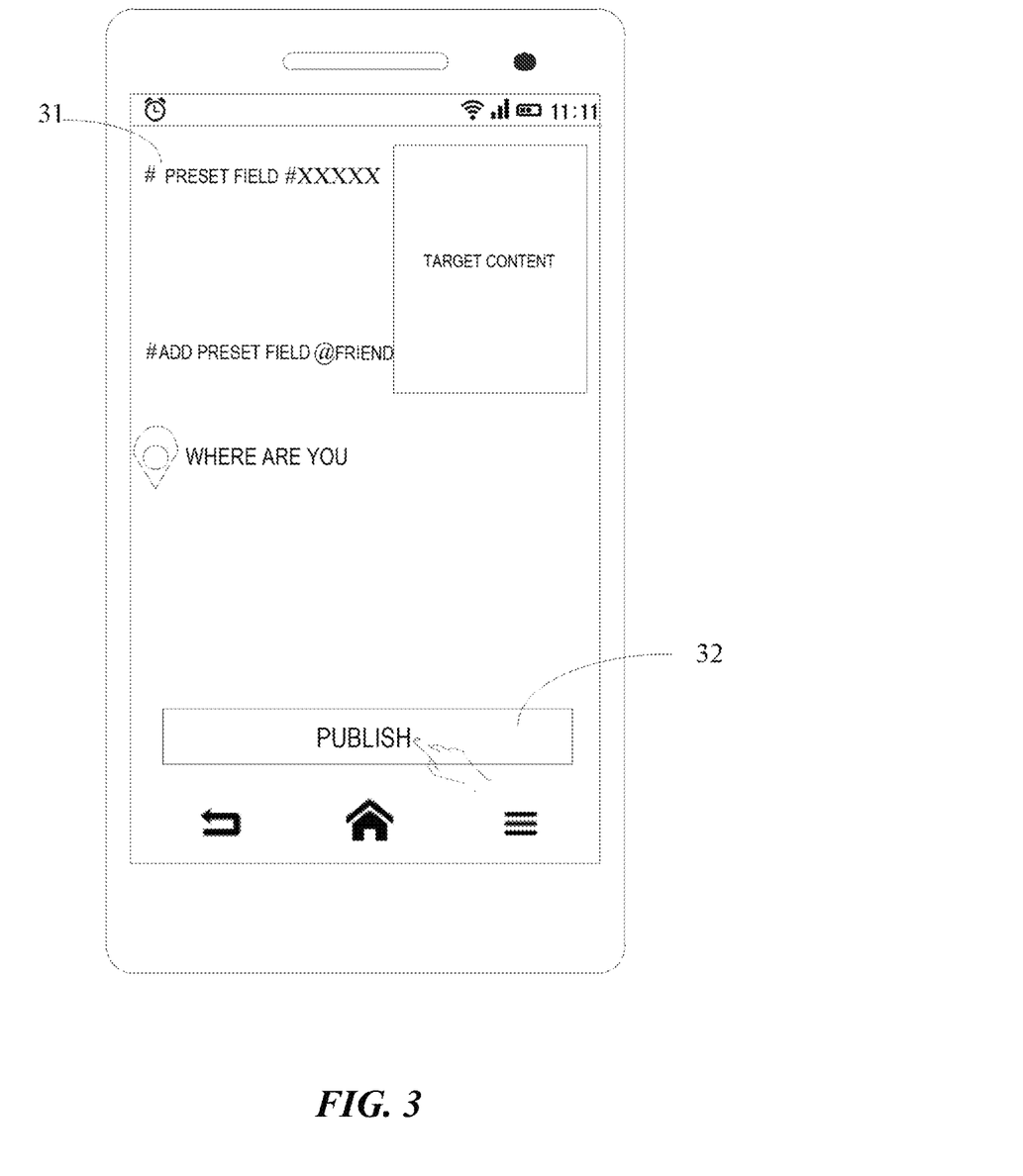
FIG. 3 illustrates a schematic diagram of an application scenario provided by embodiments of the present disclosure.

FIG. 3 illustrates a schematic diagram of an application scenario provided by embodiments of the present disclosure. As illustrated in FIG. 3, a text message 31 corresponding to the target content can be formed based on the content inputted by the first user, and the target content can be posted in response to the first user triggering a preset post button 32 on the display interface.

Figure 4:
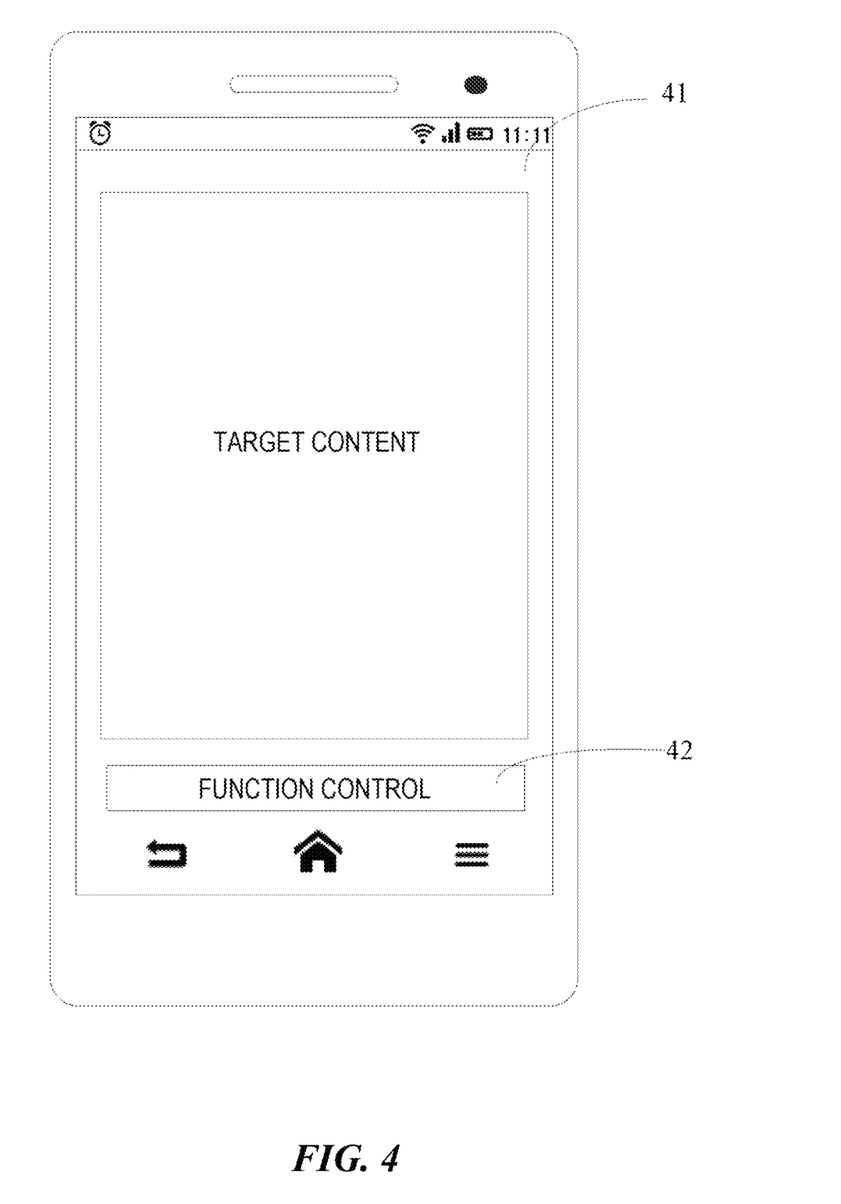
FIG. 4 illustrates a schematic diagram of another application scenario provided by embodiments of the present disclosure.

FIG. 4 illustrates a schematic diagram of another application scenario provided by embodiments of the present disclosure. If a preset field is detected in the text information, the function control 42 corresponding to the target function associated with the preset field can be displayed on the target content display interface 41 on the side of the second user after the first user posts the target content.

Optionally, the target content can be specifically media content posted in a short video application, the target content can also be pushing content posted in a news application software, etc., and the present disclosure is not limited thereto.

Embodiments of the present disclosure provide a method, apparatus, device, readable storage medium, and product for displaying a target content. The method, after generating text information corresponding to the target content based on the first user's input for the target content, in response to a post request for the target content triggered by the first user, the displaying apparatus for the target content may detect whether or not the predetermined fields are included in the text message. If the text information is detected to contain a preset field, determining a target function associated with the preset field so that after the target content is posted, a function control corresponding to the target function is displayed in a display interface of target content for a second user. In this way, the function control can be displayed based on the content input by the first user, and the first user can thus control the display of the function control according to actual requirements. In addition, according to the method, control operations for function controls can be executed according to newly posted target content, and the applicability is high.

Further, on the basis of embodiment 1, step 203 specifically comprises:
if the text information is detected to contain the preset field, determining the target function associated with the preset field, and determining whether the target content satisfies a trigger condition for the target function; and
if the target content satisfies the preset trigger condition, controlling the display interface to display the function control corresponding to the target function.

In embodiments of the present disclosure, if a preset field is detected in the text information, it can further determine whether the target content satisfies the preset trigger condition of the target function. If the trigger condition is satisfied, the control display interface displays the function controls corresponding to the target function.

Taking up the above example, when the target content is media content and the preset field is a duet, if the text information corresponding to the media content is detected to comprise a preset field, it can first detect the historical playing volume of the media content and the number of historical duets, and calculate the probability of the media content corresponding to the duet according to the historical playing volume and the number of historical duets. If the probability of the duet exceeds the preset threshold, determining that the target content satisfies the trigger conditions, the display interface may be controlled to display a function control corresponding to the target function.

Optionally, a preset network model can also be used to implement the judgment of whether the target content satisfies the trigger conditions.

Figure 5:
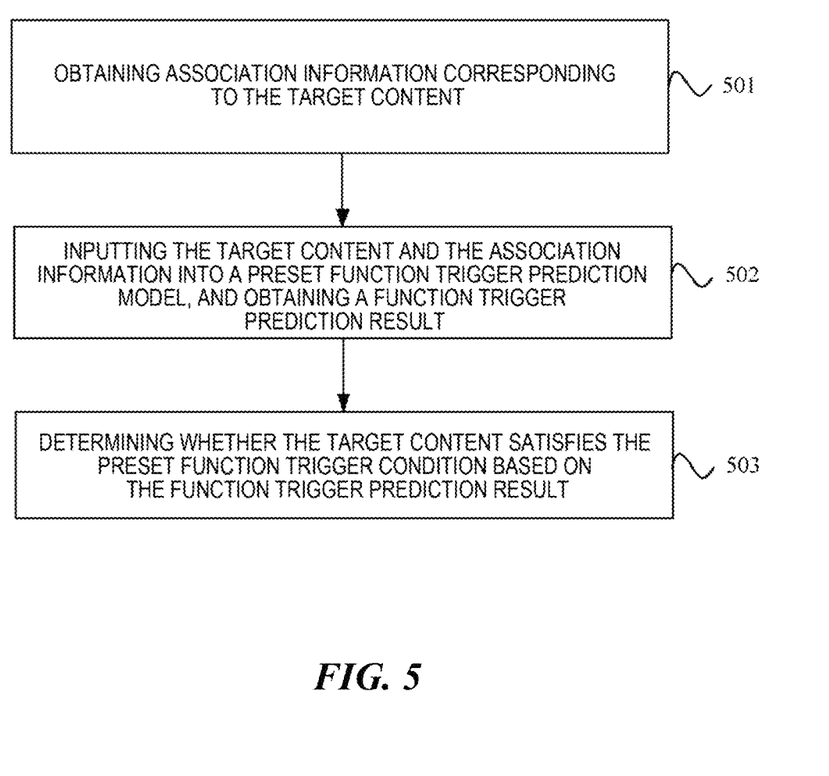
FIG. 5 illustrates a flowchart of a displaying method of target content provided by embodiment 2 of the present disclosure.

FIG. 5 illustrates a flowchart of a displaying method of target content provided by embodiment 2 of the present disclosure. On the basis of embodiment 1, as illustrated in FIG. 5, whether the target content satisfies a trigger condition for the target function comprising:

Step 501. Obtaining association information corresponding to the target content, the association information comprising parameter information of the target content per se and a parameter of user trigger function willingness, the parameter of user trigger function willingness obtained based on the detection of whether the text information contains the preset field.

Step 502. Inputting the target content and the association information into a preset function trigger prediction model and obtaining a function trigger prediction result.

Step 503. Determining whether the target content satisfies the preset function trigger condition based on the function trigger prediction result.

In embodiments of the present disclosure, the association information corresponding to the target content can first be obtained, wherein the association information comprising parameter information of the target content per se and a parameter of user trigger function willingness, the parameter of user trigger function willingness obtained according to the detection of whether the text information contains the preset field. The target content may specifically be the media content posted in the short video applications, and correspondingly, the information of the target content per se comprises one or more of a media content type, a media content duration, author information, title information, or label information. The parameter of user trigger function willingness corresponding to the target content can be obtained by detecting whether the text information contains a preset field. If the text information is detected to contain the preset field, the value of the parameter of user trigger function willingness is increased so that a probability of the target content satisfying the preset function trigger condition is increased.

After obtaining the association information corresponding to the target content, the target content and the association information can be input into the preset function trigger prediction model together to obtain the function trigger prediction result. Determining whether the target content satisfies the preset function trigger condition based on the function trigger prediction result.

Specifically, the function prediction trigger model can be trained in advance using a to-be-trained dataset. Herein, the to-be-trained dataset comprises multiple sample target contents, and the sample target contents are labeled according to whether each historical target content is the trigger condition of the target function. Thus, the trained function prediction trigger model can accurately determine whether the target content satisfies the preset function trigger conditions according to the target content and association information.

Further, on the basis of any of the above embodiments, the target function comprises duet, co-singing, or co-dancing;
  if the text information is detected to contain a preset field, determining a target function associated with the preset field so that after the target content is posted, a function control corresponding to the target function is displayed in a target content display interface for a second user comprising:
    if text information is detected to contain a first preset field, determining a co-singing function associated with the first preset field, so that a function control corresponding to the co-singing function is displayed in a target content display interface for the second user; or, if text information is detected to contain a second preset field, determining a duet function associated with the second preset field, so that a function control corresponding to the duet function is displayed in a target content display interface for the second user; or,
    if text information is detected to contain a third preset field, determining a co-dancing function associated with the third preset field, so that a function control corresponding to the co-dancing function is displayed in a target content display interface for the second user.

In embodiments of the present disclosure, the target function may specifically comprise duet, co-singing, or co-dancing. if text information is detected to contain a preset field associated with co-singing, a target content display interface for the second user can be controlled to display the button for singing together or co-singing or co-singing with him/her. Alternatively, if text information is detected to contain a preset field associated with duet, a target content display interface for the second user can be controlled to display the button for dueting together or duet or duet with him/her. Or, if text information is detected to contain a preset field associated with co-dancing, a target content display interface for the second user can be controlled to display the button for dancing together or co-dancing or co-dancing with him/her.

Figure 6:
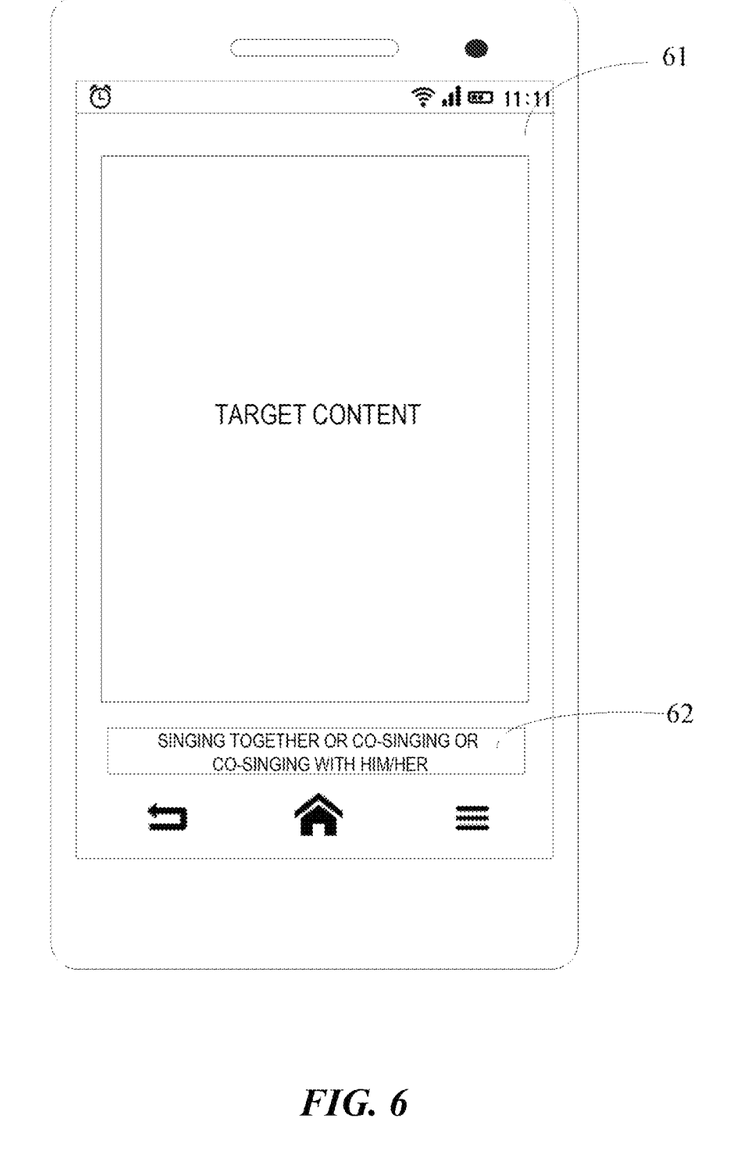
FIG. 6 illustrates a schematic diagram of another application scenario provided by embodiments of the present disclosure.

FIG. 6 illustrates a schematic diagram of another application scenario provided by embodiments of the present disclosure. As illustrated in FIG. 6, if the preset field in the text information is a co-singing field, the target content display interface 61 on the side of the second user can be controlled to display buttons for singing together or co-singing or co-singing with him/her 62. Thus, in the process of browsing the target content posted by the first user, the second user can execute the co-singing operation of the target content by triggering the button for singing together or co-singing or co-singing with him/her 62.

Correspondingly, if the side of the second user displays the target content posted by the first user, it can display the function control corresponding to the target function on the display interface. If the second user is browsing the target content posted by the first user on the side of the second user, it can trigger the function control corresponding to the target function to execute the operation in duet with the first user.

Specifically, after detecting that the second user triggers the function control corresponding to the target function, the second user can enter the duet interface corresponding to the target function. Moreover, the prompt information is displayed in the preset display area in the duet interface. Thereby, the second user can execute the operation with the first user in the duet interface according to the prompt information and obtain the duet media file.

Further, after obtaining the duet media file shot by the second user, the side of the second user can be controlled to display the target content and the duet media file at the same time. Moreover, the function controls corresponding to the target function can be displayed in the preset display area.

Embodiments of the present disclosure provides the method for displaying the target content by adopting the preset function trigger prediction model to determine whether the target content satisfies the preset function trigger condition. If the function triggering condition is satisfied, the display interface is then controlled to display the function control corresponding to the target function, so as to improve the accuracy of the display of function controls.

Figure 7:
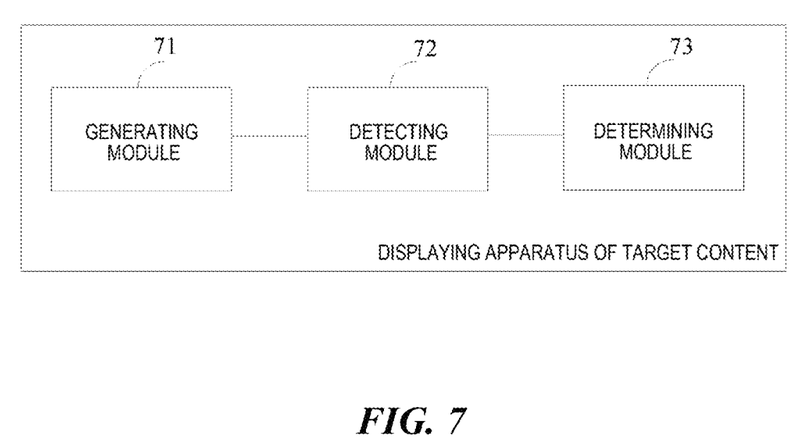
FIG. 7 illustrates a flowchart of a displaying method of target content provided by embodiment 3 of the present disclosure.

FIG. 7 illustrates a flowchart of a displaying method of target content provided by embodiment 3 of the present disclosure. As illustrated in FIG. 7, the apparatus comprises a generating module 71, a detecting module 72, and a determining module 73. Herein, the generating module 71 configured to, in response to an input from a first user for a target content, generate text information corresponding to the target content based on the input. The detecting module 72 configured to detect the text information in response to a post request for the target content triggered by the first user. The determining module 73 configured to determine a target function associated with a preset field if the text information is detected to contain the preset field, so that after the target content is posted, a function control corresponding to the target function is displayed in a target content display interface for a second user.

Further, on the basis of embodiment 3, the determining module is used to: if the text information is detected to contain the preset field, determining the target function associated with the preset field, and determining whether the target content satisfies a trigger condition for the target function; and if the target content satisfies the preset trigger condition, controlling the display interface to display the function control corresponding to the target function.

Further, on the basis of embodiment 3, the determining module is used to: obtaining association information corresponding to the target content, the association information comprising parameter information of the target content per se and a parameter of user trigger function willingness, the parameter of user trigger function willingness obtained based on the detection of whether the text information contains the preset field; inputting the target content and the association information into a preset function trigger prediction model, and obtaining a function trigger prediction result; and determining whether the target content satisfies the preset function trigger condition based on the function trigger prediction result.

Further, on the basis of embodiment 3, if the text information is detected to contain the preset field, the value of the parameter of user trigger function willingness is increased so that a probability of the target content satisfying the preset function trigger condition is increased.

Further, on the basis of embodiment 3, the target content comprises media content, the information of the target content per se comprises one or more of a media content type, a media content duration, author information, title information, or label information.

Further, on the basis of embodiment 3, the target function comprises duet, co-singing, or co-dancing; if the text information is detected to contain a preset field, determining a target function associated with the preset field so that after the target content is posted, a function control corresponding to the target function is displayed in a target content display interface for a second user comprising: if text information is detected to contain a first preset field, determining a co-singing function associated with the first preset field, so that a function control corresponding to the co-singing function is displayed in a target content display interface for the second user; or, if text information is detected to contain a second preset field, determining a duet function associated with the second preset field, so that a function control corresponding to the duet function is displayed in a target content display interface for the second user; or, if text information is detected to contain a third preset field, determining a co-dancing function associated with the third preset field, so that a function control corresponding to the co-dancing function is displayed in a target content display interface for the second user.

Further, on the basis of embodiment 3, after detecting that the second user triggers the function control corresponding to the target function, the second user can enter the duet interface corresponding to the target function. Moreover, the prompt information is displayed in the preset display area in the duet interface. Thereby, the second user can execute the operation with the first user in the duet interface according to the prompt information and obtain the duet media file.

Further, after obtaining the duet media file shot by the second user, the side of the second user can be controlled to display the target content and the duet media file at the same time. Moreover, the function controls corresponding to the target function can be displayed in the preset display area.

The device provided in embodiments of the present disclosure can be used to execute the technical scheme of the above method embodiments. The implementation principle and technical effect are similar, and the embodiment will not be repeated here.

Figure 8:
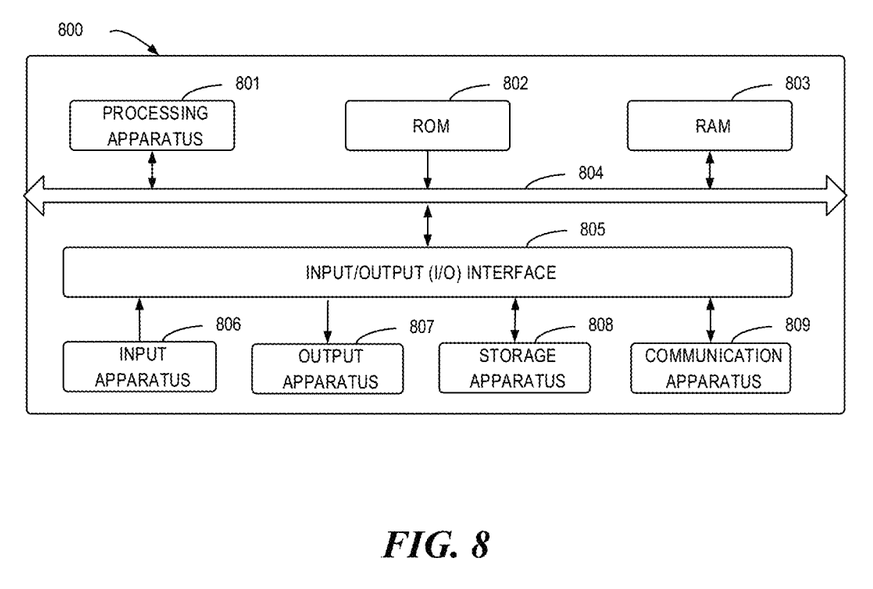
FIG. 8 illustrates a structural schematic diagram of an electronic device provided by embodiment 4 of the present disclosure.

FIG. 8 illustrates a structural schematic diagram of an electronic device provided by embodiment 4 of the present disclosure. As illustrated in FIG. 8, which illustrates a structural schematic diagram of the electronic device 800 suitable for implementing embodiments of the present disclosure. The electronic device 800 may be a terminal device or a server. Herein, the terminal device may comprise but is not limited to, such cell phones, laptop computers, digital broadcast receivers, personal digital assistants (Personal Digital Assistant, abbreviated as PDA), tablet computers (Portable Android Device, abbreviated as PAD), portable multimedia players (Portable Media Player, abbreviated as PMP), vehicle terminals (such as vehicle navigation terminals) and other mobile terminals and fixed terminals such as digital TV, desktop computers and so on. Media Player referred to as PMP), vehicle terminals (such as vehicle navigation terminals), and other mobile terminals, as well as fixed terminals such as digital TV, desktop computers, and so on. The electronic device illustrated in FIG. 8 is only an example and should not impose any limitation on the functionality and scope of use of the embodiment of the present disclosure.

As illustrated in FIG. 8, the electronic device 800 can include a processing apparatus (such as a central processing unit, graphics processor, etc.) 801, which can execute various appropriate actions and processes according to a program stored in a read-only memory (Read Only Memory, ROM for short) 802 or loaded from a storage apparatus 808 into a random access memory (Random Access Memory, RAM for short) 803. In the RAM 803, various programs and data required for the operation of the electronic device 800 are also stored. The processing apparatus 801, the ROM 802, and the RAM 803 are connected to each other through the bus 804. An Input/Output (I/O) interface 805 is also connected to bus 804.

Generally, the following apparatuses can be connected to the I/O interface 805: including an input apparatus 806 such as touch screens, touch pads, keyboards, mice, cameras, microphones, accelerometers, gyroscopes, etc.; including, for example, Liquid Crystal Display (LCD for short), an output apparatus 807 such as a speaker, a vibrator, etc.; a storage apparatus 808 such as a magnetic tape, a hard disk, etc.; and a communication apparatus 809. The communication apparatus 809 may allow the electronic device 800 to conduct wireless or wired communication with other devices to exchange data. Although FIG. 8 illustrates the electronic device 800 with various apparatuses, it should be understood that it is not required to implement or have all of the illustrated apparatuses. Alternatively, more or fewer apparatuses may be implemented or provided.

Specifically, according to the embodiments of the present disclosure, the process described above with reference to the flow diagram can be implemented as a computer software program. For example, an embodiment of the present disclosure includes a computer program product, which includes a computer program carried on a computer-readable medium, and the computer program includes a program code for executing the method shown in the flowchart. In such embodiments, the computer program can be downloaded and installed from the network through the communication apparatus 809, installed from the storage apparatus 808, or installed from the ROM 802. When the computer program is executed by the processing apparatus 801, the above functions defined in the embodiment of the present disclosure are executed.

It should be noted that the computer-readable medium mentioned in the present disclosure can be a computer-readable signal medium, a computer-readable storage medium, or any combination of the two. The computer-readable storage medium can be, for example, but not limited to, an electrical, magnetic, optical, electromagnetic, infrared, or semiconductor system, apparatus, or device, or a combination of any of the above. More specific examples of the computer-readable storage medium may include but are not limited to electrical connections with one or more wires, portable computer disks, hard disks, random access memory (RAM), read-only memory (ROM), Erasable Programmable Read-Only Memory (EPROM or flash memory for short), optical fiber, Portable Compact Disk Read-Only Memory (CD-ROM for short), optical storage devices, magnetic storage devices, or any suitable combination of the above. In the present disclosure, a computer-readable storage medium may be any tangible medium that contains or stores a program, which may be used by or in combination with an instruction execution system, apparatus, or device. In the present disclosure, the computer-readable signal medium may include data signals propagated in the baseband/or as part of the carrier, wherein a computer-readable program code is carried. The propagation of data signals can adopt various forms, including but not limited to electromagnetic signals, optical signals, or any suitable combination of the above. The computer-readable signal medium can also be any computer-readable medium other than a computer-readable storage medium. The computer-readable signal medium may send, propagate, or transmit programs for use by or in combination with instruction execution systems, apparatuses, or devices. The program code contained on the computer-readable medium can be transmitted by any suitable medium, including but not limited to wire, optical cable, Radio Frequency (RF for short), etc., or any suitable combination of the above.

The computer-readable medium may be included in the electronic device, or it may exist alone without being assembled into the electronic device.

The computer-readable medium carries one or more programs, and when one or more programs are executed by the electronic device, the electronic device is caused to execute the method shown in the embodiment.

The computer program code used to execute the operations of the present disclosure may be written in one or more programming languages or a combination thereof. The programming languages include object-oriented programming languages—such as Java, Smalltalk, and C++, and also conventional procedural programming languages—such as "C" language or similar programming languages. The program code can be executed entirely on the user's computer, partly on the user's computer, executed as an independent software package, partly on the user's computer, partly executed on a remote computer, or entirely executed on the remote computer or server. In the case of a remote computer, the remote computer can be connected to the user's computer through any kind of network-including a Local Area Network (LAN for short) or a Wide Area Network (WAN for short)—or it can be connected to an external computer (for example, using an Internet service provider to connect via the Internet).

The flow diagrams and block diagrams in the accompanying drawings illustrate the possible impossible architecture, functions, and operations of systems, methods, and computer program products according to various embodiments in the present disclosure. At this point, each block in a flow diagram or block diagram can represent a module, program segment, or part of code that contains one or more executable instructions for implementing specified logical functions. It should also be noted that in some alternative implementations, the functions indicated in the blocks can also occur in a different order than those indicated in the accompanying drawings. For example, two consecutive blocks can actually be executed in parallel, and sometimes they can also be executed in the opposite order, depending on the function involved. It should also be noted that each block in the block diagram and/or flow diagram, as well as the combination of blocks in the block diagram and/or flow diagram, can be implemented using dedicated hardware-based systems that execute specified functions or operations or can be implemented using a combination of dedicated hardware and computer instructions.

The units involved in the embodiments described in the present disclosure may be implemented by way of software or by way of hardware. Herein, the name of the unit does not constitute a limitation on the unit per se under certain circumstances. For example, a first obtaining unit can also be described as "a unit for obtaining at least two Internet Protocol addresses."

The functions described above may be at least partially executed by one or more hardware logic components. For example, without limitation, exemplary types of hardware logic components that can be used include: Field Programmable Gate Array (FPGA for short), Application Specific Integrated Circuit (ASIC for short), Application Specific Standard Product (ASSP for short), System-on-a-chip (SOC for short), Complex Programmable Logical device (CPLD for short), and so on.

In the context of the present disclosure, a machine-readable medium may be a tangible medium, which may contain or store a program for use by the instruction execution system, apparatus, or device or in combination with the instruction execution system, apparatus, or device. The machine-readable medium may be a machine-readable signal medium or a machine-readable storage medium. The machine-readable medium may include but is not limited to, an electronic, magnetic, optical, electromagnetic, infrared, or semiconductor system, apparatus, or device, or any suitable combination of the foregoing. More specific examples of machine-readable storage media would include electrical connections based on one or more wires, portable computer disks, hard disks, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

Another embodiment of the present disclosure also provides a computer program product, comprising a computer program, wherein the computer program, when executed by a processor, implements the method for displaying target content of the target content described in any of the above embodiments.

In a first aspect, according to one or more embodiments of the present disclosure, the method for displaying target content is provided, comprising:

in response to an input from a first user for a target content, generating text information corresponding to the target content based on the input;

detecting the text information in response to a post request for the target content triggered by the first user; and if the text information is detected to contain a preset field, determining a target function associated with the preset field so that after the target content is posted, a function control corresponding to the target function is displayed in a display interface of target content for a second user.

According to one or more embodiments of the present disclosure, if the text information is detected to contain a preset field, determining a target function associated with the preset field so that after the target content is posted, a function control corresponding to the target function is displayed in a target content display interface for a second user comprises: if the text information is detected to contain the preset field, determining the target function associated with the preset field, and determining whether the target content satisfies a trigger condition for the target function; and if the target content satisfies the preset trigger condition, controlling the display interface to display the function control corresponding to the target function.

According to one or more embodiments of the present disclosure, determining whether the target content satisfies the trigger condition for the target function comprising: obtaining association information corresponding to the target content, the association information comprising parameter information of the target content per se and a parameter of user trigger function willingness, the parameter of user trigger function willingness obtained based on the detection of whether the text information contains the preset field; inputting the target content and the association information into a preset function trigger prediction model, and obtaining a function trigger prediction result; and determining whether the target content satisfies the preset function trigger condition based on the function trigger prediction result.

According to one or more embodiments of the present disclosure, if the text information is detected to contain the preset field, the value of the parameter of user trigger function willingness is increased so that a probability of the target content satisfying the preset function trigger condition is increased.

According to one or more embodiments of the present disclosure, the target content comprises media content, the information of the target content per se comprises one or more of a media content type, a media content duration, author information, title information, or label information.

According to one or more embodiments of the present disclosure, the target function comprises duet, co-singing, or co-dancing; if the text information is detected to contain a preset field, determining a target function associated with the preset field so that after the target content is posted, a function control corresponding to the target function is displayed in a target content display interface for a second user comprising: if text information is detected to contain a first preset field, determining a co-singing function associated with the first preset field, so that a function control corresponding to the co-singing function is displayed in a target content display interface for the second user; or, if text information is detected to contain a second preset field, determining a duet function associated with the second preset field, so that a function control corresponding to the duet function is displayed in a target content display interface for the second user; or, if text information is detected to contain a third preset field, determining a co-dancing function associated with the third preset field, so that a function control corresponding to the co-dancing function is displayed in a target content display interface for the second user.

In the second aspect, according to one or more embodiments of the present disclosure, a target content displaying apparatus is provided, comprising:
- a generating module configured to, in response to an input from a first user for a target content, generate text information corresponding to the target content based on the input;
- a detecting module configured to detect the text information in response to a post request for the target content triggered by the first user; and
- a determining module configured to determine a target function associated with a preset field if the text information is detected to contain the preset field, so that after the target content is posted, a function control corresponding to the target function is displayed in a target content display interface for a second user.

According to one or more embodiments of the present disclosure, the determining module is used to: if the text information is detected to contain the preset field, determining the target function associated with the preset field, and determining whether the target content satisfies a trigger condition for the target function; and if the target content satisfies the preset trigger condition, controlling the display interface to display the function control corresponding to the target function.

According to one or more embodiments of the present disclosure, the determining module is used to: obtaining association information corresponding to the target content, the association information comprising parameter information of the target content per se and a parameter of user trigger function willingness, the parameter of user trigger function willingness obtained based on the detection of whether the text information contains the preset field; inputting the target content and the association information into a preset function trigger prediction model, and obtaining a function trigger prediction result; and determining whether the target content satisfies the preset function trigger condition based on the function trigger prediction result.

According to one or more embodiments of the present disclosure, if the text information is detected to contain the preset field, the value of the parameter of user trigger function willingness is increased so that a probability of the target content satisfying the preset function trigger condition is increased.

According to one or more embodiments of the present disclosure, the target content comprises media content, and the information of the target content per se comprises one or more of a media content type, a media content duration, author information, title information, or label information.

According to one or more embodiments of the present disclosure, the target function comprises duet, co-singing, or co-dancing: if the text information is detected to contain a preset field, determining a target function associated with the preset field so that after the target content is posted, a function control corresponding to the target function is displayed in a target content display interface for a second user comprising: if text information is detected to contain a first preset field, determining a co-singing function associated with the first preset field, so that a function control corresponding to the co-singing function is displayed in a target content display interface for the second user; or, if text information is detected to contain a second preset field, determining a duet function associated with the second preset field, so that a function control corresponding to the duet function is displayed in a target content display interface for the second user; or, if text information is detected to contain a third preset field, determining a co-dancing function associated with the third preset field, so that a function control corresponding to the co-dancing function is displayed in a target content display interface for the second user.

In a third aspect, according to one or more embodiments of the present disclosure, an electronic device is provided, comprising: at least one processor and memory;
- the memory storing computer-executable instructions; and
- the computer-executable instructions stored in the memory, when executed by at least one processor, causing the at least one processor to execute the method for displaying target content of any of the first aspect above and in the various possible designs of the first aspect.

In a fourth aspect, embodiments of the present disclosure provide a computer-readable storage medium stores computer-executable instructions, the computer-executable instructions, when executed by a processor, implements the method for displaying target content of the first aspect above and in the various possible designs of the first aspect.

In a fifth aspect, embodiments of the present disclosure provide a computer program product, wherein comprises a computer program, the computer program, when executed by a processor, implements the method for displaying target content of the first aspect above and in the various possible designs of the first aspect.

In a sixth aspect, embodiments of the present disclosure provide computer program, wherein the computer program, when executed by a processor, implements the method for displaying target content of the first aspect above and in the various possible designs of the first aspect.

The above description is only a preferred embodiment of the present disclosure and an explanation of the principles of the technique applied. It should be understood by those skill in the art that the scope of disclosure involved in the present disclosure is not limited to technical solutions resulting from a particular combination of the aforesaid technical features but shall also cover other technical solutions resulting from any combination of the aforesaid technical features or their equivalents without being separated from the aforesaid disclosed ideas. For example, the technical scheme formed by the substitution of the above features with the technical features disclosed in the present disclosure (but not limited to) having similar functions.

Furthermore, although each operation is depicted in a specific order, this should not be understood as requiring them to be executed in the specific order shown or in a sequential order. Under certain circumstances, multitasking and parallel processing may be advantageous. Similarly, although several specific implementation details are included in the above discussion, these should not be interpreted as limiting the scope of the present disclosure. Some features described in the context of individual embodiments can also be combined and implemented in a single embodiment. On the contrary, various features described in the context of a single embodiment can also be implemented individually or in any suitable sub-combination in a plurality of embodiments.

Although the subject matter has been described in language specific to structural features and/or method logical actions, it should be understood that the subject matter limited in the accompanying claims may not necessarily be limited to the specific features or actions described above. On the contrary, the specific features and actions described above are only exemplary forms of implementing the claims.

I claim:

1. A method of displaying content, comprising:
   in response to an input from a first user for a content, generating text information corresponding to the content based on the input;
   detecting the text information in response to a post request for the content triggered by the first user; and
   in response to detecting that the text information contains a predetermined field, determining a function associated with the predetermined field so that after the content is posted, a function control corresponding to the function is displayed in a display interface of content for a second user.

2. The method of claim 1, wherein in response to detecting that the text information contains a predetermined field, determining a function associated with the predetermined field so that after the content is posted, a function control corresponding to the function is displayed in a content display interface for a second user comprises:
   in response to detecting that the text information is detected to contain the predetermined field, determining the function associated with the predetermined field, and determining whether the content satisfies a trigger condition for the function; and
   in response to detecting that the content satisfies the trigger condition, controlling the display interface to display the function control corresponding to the function.

3. The method of claim 2, wherein determining whether the content satisfies a trigger condition for the function comprises:
   obtaining association information corresponding to the content, the association information comprising parameter information of the content per se and a parameter of user trigger function willingness, the parameter of user trigger function willingness obtained based on the detection of whether the text information contains the predetermined field;
   inputting the content and the association information into a predetermined function trigger prediction model, and obtaining a function trigger prediction result; and
   determining whether the content satisfies a predetermined function trigger condition based on the function trigger prediction result.

4. The method of claim 3, wherein in response to detecting that the text information contains the predetermined field, a value of the parameter of user trigger function willingness is increased so that a probability of the content satisfying the predetermined function trigger condition is increased.

5. The method of claim 3, wherein the content comprises media content, an information of the content per se comprises one or more of a media content type, a media content duration, author information, title information, or label information.

6. The method of claim 1, wherein the function comprises duet, co-singing, or co-dancing; in response to detecting that the text information contains a predetermined field, determining a function associated with the predetermined field so that after the content is posted, a function control corresponding to the function is displayed in a content display interface for a second user comprising: in response to detecting that the text information contains a first predetermined field, determining a co-singing function associated with the first predetermined field, so that a function control corresponding to the co-singing function is displayed in a content display interface for the second user; or, in response to detecting that the text information contains a second predetermined field, determining a duet function associated with the second predetermined field, so that a function control corresponding to the duet function is displayed in a content display interface for the second user; or, in response to detecting that the text information contains a third predetermined field, determining a co-dancing function associated with the third predetermined field, so that a function control corresponding to the co-dancing function is displayed in a content display interface for the second user.

7. An electronic device comprising:
   at least one processor and memory; and
   the memory storing computer-executable instructions;
   the computer-executable instructions, when executed by at least one processor, causing the at least one processor to perform acts comprising:
      in response to an input from a first user for a content, generating text information corresponding to the content based on the input;
      detecting the text information in response to a post request for the content triggered by the first user; and
      in response to detecting that the text information contains a predetermined field, determining a function associated with the predetermined field so that after the content is posted, a function control corresponding to the function is displayed in a display interface of content for a second user.

8. The electronic device of claim 7, wherein in response to detecting that the text information contains a predetermined field, determining a predetermined function associated with the predetermined field so that after the content is posted, a function control corresponding to the function is displayed in a content display interface for a second user comprises:
   in response to detecting that the text information contains the predetermined field, determining the function associated with the predetermined field, and determining whether the content satisfies a trigger condition for the function; and in response to determining that the content satisfies the trigger condition, controlling the display interface to display the function control corresponding to the function.

9. The electronic device of claim 8, wherein determining whether the content satisfies a trigger condition for the function comprises:

obtaining association information corresponding to the content, the association information comprising parameter information of the content per se and a parameter of user trigger function willingness, the parameter of user trigger function willingness obtained based on the detection of whether the text information contains the predetermined field;

inputting the content and the association information into a predetermined function trigger prediction model, and obtaining a function trigger prediction result; and determining whether the content satisfies a predetermined function trigger condition based on the function trigger prediction result.

10. The electronic device of claim 9, wherein in response to detecting that the text information contains the predetermined field, a value of the parameter of user trigger function willingness is increased so that a probability of the content satisfying the predetermined function trigger condition is increased.

11. The electronic device of claim 9, wherein the content comprises media content, an information of the content per se comprises one or more of a media content type, a media content duration, author information, title information, or label information.

12. The electronic device of claim 7, wherein the function comprises duet, co-singing, or co-dancing;

in response to detecting that the text information contains a predetermined field, determining a function associated with the predetermined field so that after the content is posted, a function control corresponding to the function is displayed in a content display interface for a second user comprising:

in response to detecting that the text information contains a first predetermined field, determining a co-singing function associated with the first predetermined field, so that a function control corresponding to the co-singing function is displayed in a content display interface for the second user; or, in response to detecting that the text information contains a second predetermined field, determining a duet function associated with the second predetermined field, so that a function control corresponding to the duet function is displayed in a content display interface for the second user; or, in response to detecting that the text information contains a third predetermined field, determining a co-dancing function associated with the third predetermined field, so that a function control corresponding to the co-dancing function is displayed in a content display interface for the second user.

13. A non-transitory computer-readable storage medium storing computer-executable instructions, the computer-executable instructions, when executed by a processor, implementing acts comprising:

in response to an input from a first user for a content, generating text information corresponding to the content based on the input;

detecting the text information in response to a post request for the content triggered by the first user; and in response to detecting that the text information contains a predetermined field, determining a function associated with the predetermined field so that after the content is posted, a function control corresponding to the function is displayed in a display interface of content for a second user.

14. The non-transitory computer-readable storage medium of claim 13, wherein in response to detecting that the text information contains a predetermined field, determining a function associated with the predetermined field so that after the content is posted, a function control corresponding to the function is displayed in a content display interface for a second user comprises:

in response to detecting that the text information contains the predetermined field, determining the function associated with the predetermined field, and determining whether the content satisfies a trigger condition for the function; and in response to determining that the content satisfies the predetermined trigger condition, controlling the display interface to display the function control corresponding to the function.

15. The non-transitory computer-readable storage medium of claim 14, wherein determining whether the content satisfies a trigger condition for the function comprises:

obtaining association information corresponding to the content, the association information comprising parameter information of the content per se and a parameter of user trigger function willingness, the parameter of user trigger function willingness obtained based on the detection of whether the text information contains the predetermined field;

inputting the content and the association information into a predetermined function trigger prediction model, and obtaining a function trigger prediction result; and determining whether the content satisfies a predetermined function trigger condition based on the function trigger prediction result.

16. The non-transitory computer-readable storage medium of claim 15, wherein in response to detecting that the text information contains the predetermined field, a value of the parameter of user trigger function willingness is increased so that a probability of the content satisfying the predetermined function trigger condition is increased.

17. The non-transitory computer-readable storage medium of claim 15, wherein the content comprises media content, an information of the content per se comprises one or more of a media content type, a media content duration, author information, title information, or label information.

18. The non-transitory computer-readable storage medium of claim 13, wherein the function comprises duet, co-singing, or co-dancing;

in response to detecting that the text information contains a predetermined field, determining a function associated with the predetermined field so that after the content is posted, a function control corresponding to the function is displayed in a content display interface for a second user comprising:

in response to detecting that the text information contains a first predetermined field, determining a co-singing function associated with the first predetermined field, so that a function control corresponding to the co-singing function is displayed in a content display interface for the second user; or, in response to detecting that the text information contains a second predetermined field, determining a duet function associated with the second predetermined field, so that a function control corresponding to the duet function is displayed in a content display interface for the second user; or, in response to detecting that the text information contains a third predetermined field, determining a co-dancing function associated with the third predetermined field, so that a function control corresponding to the co-dancing function is displayed in a content display interface for the second user.

\* \* \* \* \*